(12) United States Patent
Yamamoto

(10) Patent No.: US 8,270,091 B2
(45) Date of Patent: Sep. 18, 2012

(54) PROJECTION VARIABLE FOCUSING LENS AND PROJECTION DISPLAY DEVICE

(75) Inventor: Chikara Yamamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 426 days.

(21) Appl. No.: 12/492,288

(22) Filed: Jun. 26, 2009

(65) Prior Publication Data

US 2010/0020293 A1    Jan. 28, 2010

(30) Foreign Application Priority Data

Jul. 24, 2008    (JP) ................ P2008-191534

(51) Int. Cl.
*G02B 15/14* (2006.01)
*G02B 9/12* (2006.01)
*G02B 9/34* (2006.01)
*G02B 9/58* (2006.01)

(52) U.S. Cl. ........ 359/680; 359/681; 359/682; 359/683; 359/684

(58) Field of Classification Search .............. 353/101; 359/680, 681, 682, 683, 684, 781, 782, 783

See application file for complete search history.

(56) References Cited

U.S. PATENT DOCUMENTS

| | | | | |
|---|---|---|---|---|
| 6,545,817 | B2 * | 4/2003 | Hirose | 359/683 |
| 6,888,682 | B2 * | 5/2005 | Kawakami | 359/651 |
| 2004/0119950 | A1 * | 6/2004 | Penn et al. | 353/97 |
| 2005/0046960 | A1 * | 3/2005 | Saori | 359/680 |
| 2008/0013186 | A1 * | 1/2008 | Wada | 359/663 |

FOREIGN PATENT DOCUMENTS

JP    2005-300619 A    10/2005

* cited by examiner

*Primary Examiner* — Francis M Legasse, Jr.
*Assistant Examiner* — Bao-Luan Le
(74) *Attorney, Agent, or Firm* — Birch, Stewart, Kolasch & Birch, LLP

(57) ABSTRACT

Disclosed is a projection variable focusing lens and a projection display device that has a reduction side which is telecentric, a high magnifying power, a small size, a light weight, and a low manufacturing cost and is capable of correcting all aberrations occurring when power varies with good balance. A projection variable focusing lens that moves only one lens group when power varies includes a first negative lens group $G_1$, a second positive lens group $G_2$, and a third positive lens group $G_3$, arranged in this order from a magnification side. When a focal length varies, only the second lens group $G_2$ is moved along an optical axis X. During focusing, the first lens group $G_1$ is moved along the optical axis X. A reduction side is substantially telecentric.

13 Claims, 9 Drawing Sheets

EXAMPLE 1

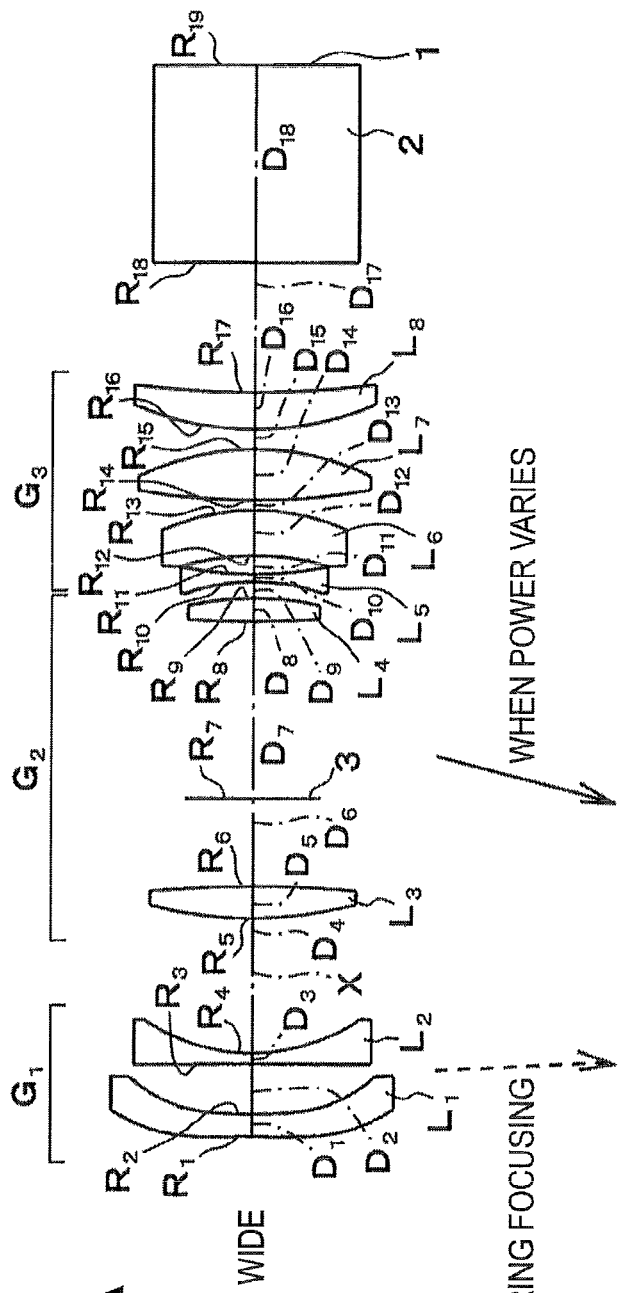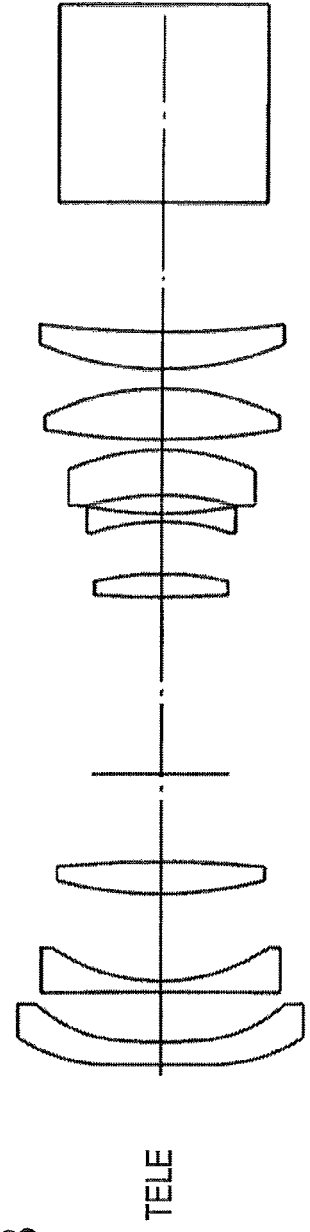
FIG.1A EXAMPLE 1
FIG.1B

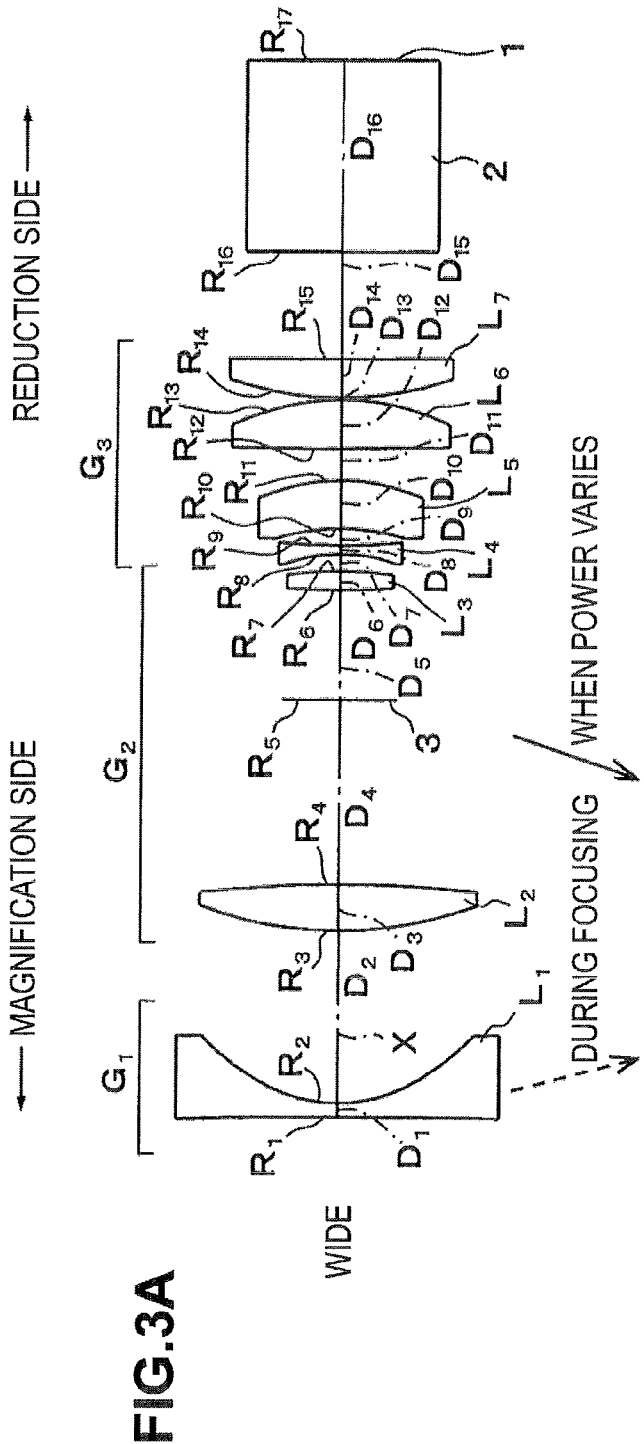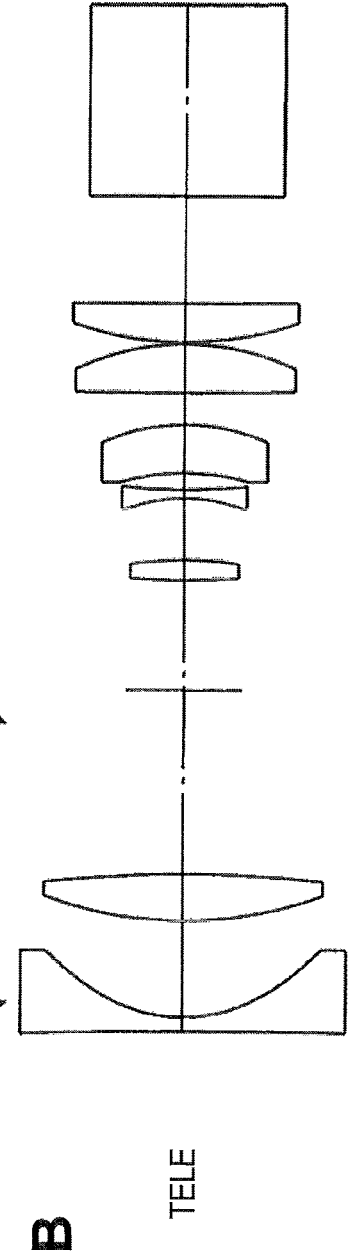
FIG.3A EXAMPLE 3 WIDE
FIG.3B TELE

EXAMPLE 1 (WIDE, PROJECTION DISTANCE 109.85)

EXAMPLE 1 (TELE, PROJECTION DISTANCE 109.85)

EXAMPLE 2 (WIDE, PROJECTION DISTANCE 125.40)

EXAMPLE 2 (TELE, PROJECTION DISTANCE 125.40)

EXAMPLE 3 (WIDE, PROJECTION DISTANCE 125.50)

EXAMPLE 3 (TELE, PROJECTION DISTANCE 125.50)

EXAMPLE 4 (WIDE, PROJECTION DISTANCE 125.35)

EXAMPLE 4 (TELE, PROJECTION DISTANCE 125.35)

US 8,270,091 B2

PROJECTION VARIABLE FOCUSING LENS AND PROJECTION DISPLAY DEVICE

CROSS-REFERENCE TO RELATED APPLICATIONS

This application is based upon and claims the benefit of priority from the Japanese Patent Application No. 2008-191534 filed on Jul. 24, 2008; the entire contents of which are incorporated herein by reference.

BACKGROUND OF THE INVENTION

1. Field of the Invention

The present invention relates to a variable focusing lens that includes three lens groups and is provided in, for example, a projection display device, and a projection display device including the variable focusing lens, more particularly, to a projection variable focusing lens and a projection display device that enlarge and project light having image information from a light valve of, for example, a transmissive or reflective liquid crystal display device or a DMD (digital micro-mirror device) display device onto a screen.

2. Description of the Related Art

In recent years, projection display devices using light valves, such as a liquid crystal display device or a DMD display device, have come into widespread use. In particular, a projection display device has been widely used which uses three light valves corresponding to illumination light components of three primary colors, such as R, G, and B, to modulate the illumination light components, and combines the light components modulated by the three light valves using, for example, a prism, and displays an image on a screen using a projection lens.

As the size of the light valve is reduced, the precision thereof is improved, and personal computers are widely spread, the use of the projection display device for presentation is increased. It is preferable that the projection display device have high user convenience and be easy to install. Therefore, there is an increasing demand for a projection display device having a high performance, a high magnifying power, a small size, and a light weight. In addition, there is an increasing demand for a projection lens having a high performance, a high magnifying power, a small size, and a light weight. Further, there is an increasing demand for a projection lens with a low manufacturing cost.

When a color composition prism for composing the modulated light components from a plurality of light valves or a TIR prism for separating illumination light from projection light is provided in an optical system, the reduction side of the projection lens needs to be substantially telecentric in order to prevent the occurrence of color unevenness in the color composition prism and in order to prevent a reduction in separation efficiency in the TIR prism.

As a projection lens capable of meeting the above-mentioned various demands, various types of projection zoom lenses have been known. The zoom lens generally includes two or more variable power lens groups that are moved together when power varies and a focusing lens group. In the zoom lens, a lens driving unit, such as a cam mechanism, is complicated, and it is difficult to reduce the size, weight, and cost of the zoom lens.

JP-A-2005-300619 discloses a projection zoom lens that uses one lens group to perform zooming and uses another lens group to perform focusing.

However, since the projection zoom lens disclosed in JP-A-2005-300619 also has a zoom function, there are restrictions in the movement of the lens groups when power varies. Therefore, there is a large variation in aberration when power varies.

Further, in the projection zoom lens disclosed in JP-A-2005-300619, the number of lenses arranged on the reduction side in the lens group for varying power is small, and it is difficult to obtain a high zoom ratio in an optical system in which the reduction side is substantially telecentric.

SUMMARY OF THE INVENTION

The invention has been made in order to solve the above-mentioned problems, and an object of the invention is to provide a projection variable focusing lens and a projection display device that has a reduction side which is telecentric, a high magnifying power, a small size, a light weight, and a low manufacturing cost without being affected by the problems inherent in a zoom lens and is capable of effectively correcting all aberrations, particularly, aberrations occurring when power varies with good balance.

According to an aspect of the invention, a projection variable focusing lens includes a first lens group having a negative refractive power, a second lens group having a positive refractive power, and a third lens group having a positive refractive power arranged in this order from a magnification side. When a focal length varies, the second lens group is moved in an optical axis direction. During focusing, the first lens group is moved in the optical axis direction. A reduction side is substantially telecentric.

The third lens group may include two or more lenses.

The second lens group may satisfy Conditional expression 1 given below:

$$1.0 < f_2/f_w < 4.0 \qquad \text{[Conditional expression 1]}$$

(where $f_w$ indicates the focal length of the entire system at a wide angle end, and $f_2$ indicates the focal length of the second lens group).

The second lens group may satisfy Conditional expression 2 given below:

$$0.15 < D_2/L < 0.55 \qquad \text{[Conditional expression 2]}$$

(where $D_2$ indicates the largest surface spacing between lenses in the second lens group and L indicates the total length of the lenses).

The second lens group may include two positive lenses.

The third lens group may include a first negative lens, a second positive lens having a convex surface facing the reduction side, a third positive lens having a convex surface facing the reduction side, and a fourth positive lens having a convex surface facing the magnification side arranged in this order from the magnification side.

The first lens group may have two lenses including a negative lens that has a concave surface facing the reduction side. Alternatively, the first lens group may include one negative lens having a concave surface facing the reduction side.

The first lens group may include at least one aspheric surface.

The first lens group may have two lenses including a negative lens that has a concave surface facing the reduction side. The second lens group may include two positive lenses. The third lens group may include a first negative lens, a second positive lens having a convex surface facing the reduction side, a third positive lens having a convex surface facing the reduction side, and a fourth positive lens having a convex surface facing the magnification side arranged in this order from the magnification side. The entire system may include eight lenses.

The first lens group may include one negative lens having a concave surface facing the reduction side. The second lens group may include two positive lenses. The third lens group may include a first negative lens, a second positive lens having a convex surface facing the reduction side, a third positive lens having a convex surface facing the reduction side, and a fourth positive lens having a convex surface facing the magnification side arranged in this order from the magnification side. The entire system may include seven lenses.

According to another aspect of the invention, a projection display device includes: at least one light source; at least one light valve; at least one illumination optical unit that guides light emitted from the light source to the light valve; and the projection variable focusing lens. The light valve modulates the light emitted from the light source, and the modulated light is projected onto a screen by the projection variable focusing lens.

According to the above-mentioned aspect of the invention, the projection variable focusing lens includes the first negative lens group, the second positive lens group, and the third positive lens group having arranged in this order from the magnification side. When a focal length varies, the second lens group is moved in the optical axis direction. During focusing, the first lens group is moved in the optical axis direction. A reduction side is substantially telecentric.

According to the above-mentioned structure, it is possible to provide a projection variable focusing lens that has a reduction side which is telecentric, a high magnifying power, a small size, a light weight, and a low manufacturing cost without being affected by the problems inherent in the zoom lens, as will be described below. In addition, it is possible to effectively correct aberrations occurring when power varies with good balance.

However, in the related art, the zoom lens is used to form a projection lens having a function of changing power. Therefore, when power varies, it is necessary to move two or more lens groups together. In general, it is necessary to move the other lens groups during focusing. Therefore, a large number of lens groups are moved. As a result, it is difficult to reduce the size, weight, and cost of the projection lens.

However, in the invention, a variable focusing lens is used to change the power of a projection lens, and only one lens group is moved to vary the power. Therefore, a complicate lens driving mechanism, such as a cam mechanism, is not needed. As a result, it is possible to reduce the size, weight, and cost of each stage, as compared to the related art. In the case of the zoom lens, there are restrictions in the relative movement of the lens groups when power varies, which results in a large variation in aberration when power varies. However, in the projection variable focusing lens according to the invention, it is possible to remove restrictions in the movement of the lens groups when power varies. Therefore, it is possible to significantly reduce an aberration variation when power varies.

The variable focusing lens has been used for, for example, an imaging lens. When power varies, the conjugation length of the variable focusing lens is changed. Therefore, focus adjustment is needed for focusing, and the focus adjustment is performed whenever an image is captured.

However, in the projection lens, generally, once the projection display device and a screen are set, it is not necessary to change power whenever a projection operation is performed, and only one focus adjustment operation is performed at the beginning. Therefore, the above-mentioned problems of the imaging lens do not arise.

Further, in the projection variable focusing lens according to the invention, among three lens groups, the second lens group from the magnification side is used to change power, unlike the projection zoom lens disclosed in JP-A-2005-300619. Therefore, an optical system in which the reduction side is substantially telecentric can obtain a high zoom ratio.

According to the above-mentioned structure, when the third lens group arranged closest to the reduction side includes two or more lenses, it is possible to easily ensure the telecentricity of the reduction side.

Furthermore, the projection display device according to the invention uses the projection variable focusing lens according to the invention. Therefore, the projection display device can have a high magnifying power, a small size, a light weight, and a low manufacturing cost, and maintain a high optical performance.

BRIEF DESCRIPTION OF THE DRAWINGS

FIGS. 1A and 1B are diagrams schematically illustrating the structure of a projection variable focusing lens according to Example 1 of the invention at a wide angle end (wide) and a telephoto end (tele);

FIGS. 3A and 3B are diagrams schematically illustrating the structure of a projection variable focusing lens according to Example 3 of the invention at a wide angle end (wide) and a telephoto end (tele);

DESCRIPTION OF THE PREFERRED EMBODIMENTS

Figure 2A:
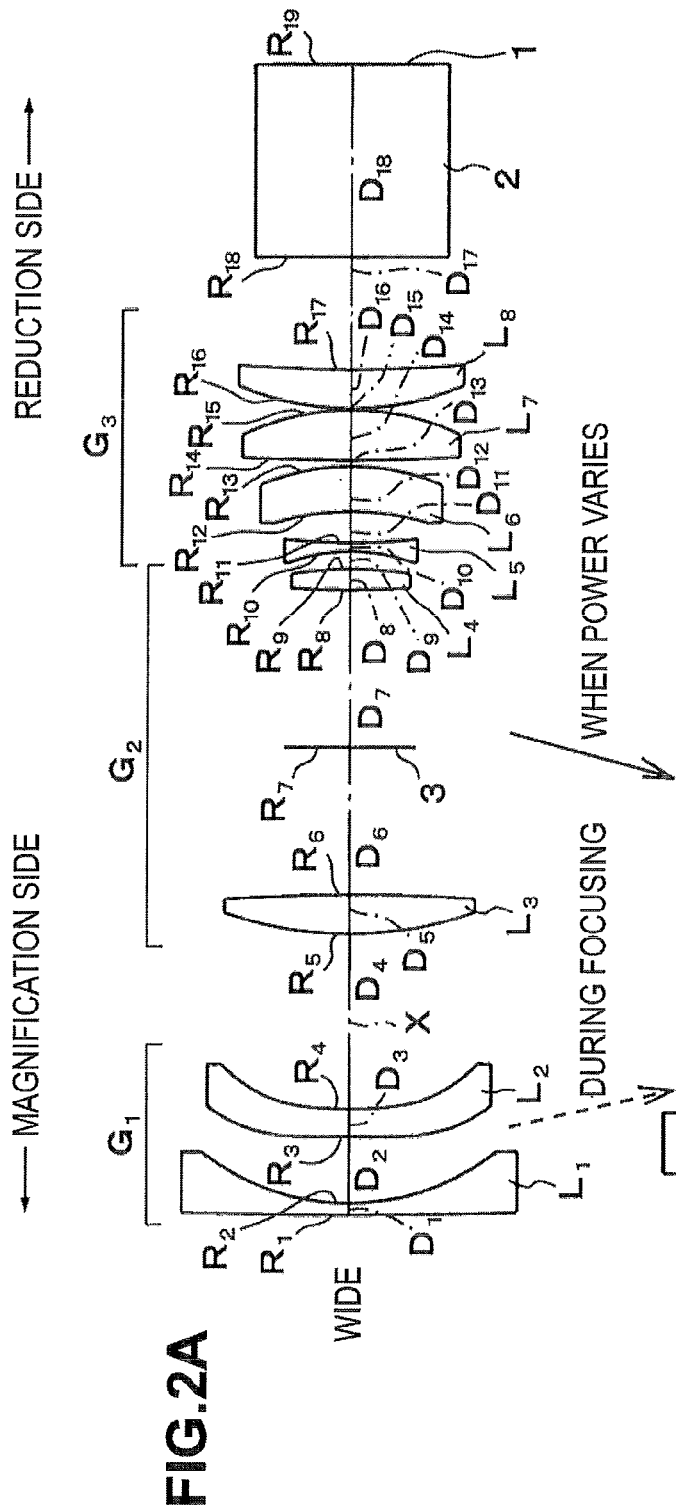
FIGS. 2A and 2B are diagrams schematically illustrating the structure of a projection variable focusing lens according to Example 2 of the invention at a wide angle end (wide) and a telephoto end (tele)

Hereinafter, exemplary embodiments of the invention will be described with reference to the accompanying drawings. A projection variable focusing lens according to an embodiment of the invention shown in FIG. 1 (which is a representative example of a projection variable focusing lens according to Example 1) in which the reduction side is substantially telecentric, includes a first lens group $G_1$ having a negative refractive power, a second lens group $G_2$ having a positive refractive power, and a third lens group $G_3$ having a positive refractive power arranged in this order from a magnification side. A glass block (which includes a filter unit) 2, which is mainly a color composition prism, and an image display surface 1 of a light valve, such as a liquid crystal display panel, are provided in the rear stage of the projection variable focusing lens. In FIG. 1, X indicates an optical axis.

When power varies (when a focal length varies), the second lens group $G_2$ (which includes a mask (aperture diaphragm) 3) is moved along the optical axis X. During focusing, the first lens group $G_1$ is moved along the optical axis X.

The first lens group $G_1$ includes a first lens $L_1$, which is an aspheric lens (which is preferably made of plastic) having at least one aspheric surface that is concave to the reduction side, and a second lens $L_2$, which is a negative lens having a concave surface facing the reduction side (in Example 2, the first lens group $G_1$ includes a first lens $L_1$, which is a negative lens having a concave surface facing the reduction side, and a second lens $L_2$, which is an aspheric lens having at least one aspheric surface that is concave to the reduction side; in Example 3, the first lens group $G_1$ includes a first lens $L_1$, which is an aspheric lens having at least one aspheric surface that is concave to the reduction side; and in Example 4, the first lens group $G_1$ includes a first lens $L_1$, which is a composite aspheric lens obtained by bonding a resin film molded into an aspheric shape to a reduction-side surface of a negative meniscus lens (which is preferably made of glass) having a concave surface facing the reduction side).

The first lens group $G_1$ has two lenses including a negative lens having a concave surface facing the reduction side, or only one negative lens having a concave surface facing the reduction side. Therefore, it is possible to reduce the size and cost of a lens system. In particular, the first lens group $G_1$ includes an aspheric surface. Therefore, it is possible to significantly reduce manufacturing costs by decreasing an outside diameter.

The second lens group $G_2$ includes two positive lenses. Therefore, it is possible to reduce the size and cost of a lens system. It is more preferable that the second lens group $G_2$ include two positive lenses $L_3$ and $L_4$ and a mask (or an aperture diaphragm, which is similarly applied to the following description) 3 provided therebetween. When the mask 3 is provided between the two positive lenses, it is possible to further improve telecentricity on the reduction side.

In the second lens group $G_2$, it is preferable that the two positive lenses all have a refractive index of 1.65 or more in order to correct aberration.

The third lens group $G_3$ includes a negative lens, a positive (or negative) lens having a convex surface facing the reduction side, a positive lens having a convex surface facing the reduction side, and a positive meniscus lens having a convex surface facing the magnification side arranged in this order from the magnification side. In this way, it is possible to reduce an aberration variation during focusing. It is more preferable that the third lens group $G_3$ include a fifth lens $L_5$, which is a biconcave lens, a sixth lens $L_6$, which is a positive meniscus lens having a convex surface facing the reduction side, a seventh lens $L_7$, which is a biconvex lens, and an eighth lens $L_8$, which is a positive meniscus lens having a convex surface facing the magnification side (in Examples 3 and 4, the third lens group $G_3$ includes a fourth lens $L_4$, which is a biconcave lens, a fifth lens $L_5$, which is a positive meniscus lens having a convex surface facing the reduction side, a sixth lens $L_6$, which is a biconvex lens, and a seventh lens $L_7$, which is a positive meniscus lens having a convex surface facing the magnification side).

Therefore, in this embodiment, since the third lens group $G_3$ includes two or more lenses, it is easy to ensure the telecentricity of the reduction side of the lens system.

In the third lens group $G_3$, it is preferable that the second to fourth lenses from the magnification side all have a refractive index of less than 1.65 in order to reduce costs.

In the projection variable focusing lens according to this embodiment, it is possible to vary power by moving only the second lens group $G_2$, and a complicate lens driving mechanism, such as a cam mechanism, is not needed. Therefore, it is possible to reduce the size, weight, and cost of each stage, as compared to the related art. In this embodiment, the total number of lenses in all of the lens groups having the above-mentioned structure is seven or eight. A reduction in the number of lenses is achieved using a variable focusing lens, not a zoom lens.

In addition, it is possible to remove restrictions in moving the lens groups together when power varies. Therefore, it is possible to significantly reduce an aberration variation when power varies.

The conjugation length of the 'variable focusing lens' is changed when power varies, and the variable focusing lens is out of focus. In this case, focusing is needed. However, one lens group can be moved to vary power. A minimum of two moving groups is sufficient for focusing even considering another focus group.

In contrast to the 'variable focusing lens', the 'zoom lens' has a constant conjugation length when power varies, and a focusing lens is used to adjust a little variation in the conjugation length. When power varies, two or more moving groups are moved relative to each other by a zoom cam mechanism according to a predetermined rule. When another focus group is considered, three or more lens groups are moved, which is disadvantageous in reducing the size, weight, and cost of an optical lens system.

As described above, since the projection variable focusing lens according to this embodiment is a zoom lens in which a lens closest to the magnification side has a negative power, it is easy to increase an angle of view and it is possible to ensure back focus with an appropriate length.

Further, in the projection variable focusing lens according to this embodiment, it is preferable that all the lenses be single lenses without using cemented lenses having low heat resistance. In this case, it is possible to prevent thermal problems arising in a projection lens having a very high system temperature (particularly, at a position where a beam width is narrow).

Furthermore, in the projection variable focusing lens according to this embodiment, it is preferable that the second lens group $G_2$ satisfy at least one of Conditional expressions 1 and 2 given below:

$$1.0 < f_2/f_w < 4.0, \text{ and} \qquad \text{[Conditional expression 1]}$$

$$0.15 < D_2/L < 0.55 \qquad \text{[Conditional expression 2]}$$

(where $f_w$ indicates the focal length of the entire system at a wide angle end, $f_2$ indicates the focal length of the second lens group $G_2$, $D_2$ indicates the largest surface spacing between lenses in the second lens group $G_2$, and L indicates the total length of lenses).

Next, the technical meaning of the above-mentioned Conditional expressions 1 and 2 will be described.

First, Conditional expression 1 defines the range of the ratio between the focal length $f_2$ of the second lens group $G_2$, which is a moving group for varying power, and the focal length $f_w$ of the entire system at the wide angle end, and also defines the power range of the second lens group $G_2$. In addition, Conditional expression 1 defines a range capable of effectively correcting each aberration and reducing the size of a lens system. That is, if the ratio is equal to or less than the lower limit of Conditional expression 1, it is difficult to correct aberration. On the other hand, if the ratio is equal to or greater than the upper limit of Conditional expression 1, the movement of the lens is increased, which results in an increase in the total length of the lenses. The second lens group preferably satisfies the following Conditional expression 1' and more preferably, the following Conditional expression 1" in order to more effectively obtain the effects of Conditional expression 1:

$$1.3 < f_2/f_w < 3.0, \text{ and} \qquad \text{[Conditional expression 1']}$$

$$1.5 < f_2/f_w < 2.5. \qquad \text{[Conditional expression 1"]}$$

Conditional expression 2 defines the range of the ratio of the largest surface spacing $D_2$ between the lenses in the second lens group $G_2$ to the total length L of the lenses, and also defines a range capable of effectively correcting each aberration, particularly, an image surface or distortion, and reducing the size of a lens system. That is, if the ratio is equal to or less than the lower limit of Conditional expression 2, it is difficult to correct aberration, particularly, an image surface or distortion. On the other hand, if the ratio is equal to or greater than the upper limit of Conditional expression 2; the movement of the lens is increased, which results in an increase in the total length of the lenses. The second lens group preferably satisfies the following Conditional expression 2' and more preferably, the following Conditional expression 2" in order to more effectively obtain the effects of Conditional expression 2:

$$0.2 < D_2/L < 0.5, \text{ and} \qquad \text{[Conditional expression 2']}$$

$$0.25 < D_2/L < 0.4. \qquad \text{[Conditional expression 2"]}$$

When the following Conditional expression 3 is satisfied, a back focus Bf that is 1.2 times longer than the focal length $f_w$ of the entire system at the wide angle end is ensured to obtain good telecentricity and an optical system, such as a prism, for color composition or beam separation is arranged on the reduction side, it is possible to solve problems, such as color unevenness and a reduction in the separation efficiency of illumination light and projection light, due to deterioration of dichroic film characteristics:

$$Bf/f_w > 1.2. \qquad \text{[Conditional expression 3]}$$

It is preferable that the following Conditional expression 3' be satisfied in order to more effectively obtain the effects of Conditional expression 3:

$$Bf/f_w > 1.45. \qquad \text{[Conditional expression 3']}$$

The projection variable focusing lens according to each of the following examples includes at least one aspheric surface in the first lens group $G_1$. In this way, it is possible to effectively correct distortion. The shape of the aspheric surface is represented by the following aspheric expression:

$$Z = \frac{Y^2/R}{1 + \sqrt{1 - K \times Y^2/R^2}} + \sum_{i=3}^{12} A_i Y^i \qquad \text{[Expression 1]}$$

(where Z indicates the length of a perpendicular line that drops from a point on an aspheric surface at a distance Y from the optical axis to a tangent plane to the top of the aspheric surface (a plane vertical to the optical axis), Y indicates a distance from the optical axis, R indicates a curvature radius of an aspheric surface near the optical axis, K indicates eccentricity, and $A_i$ indicates an aspheric coefficient (i=3 to 12)).

Figure 13:
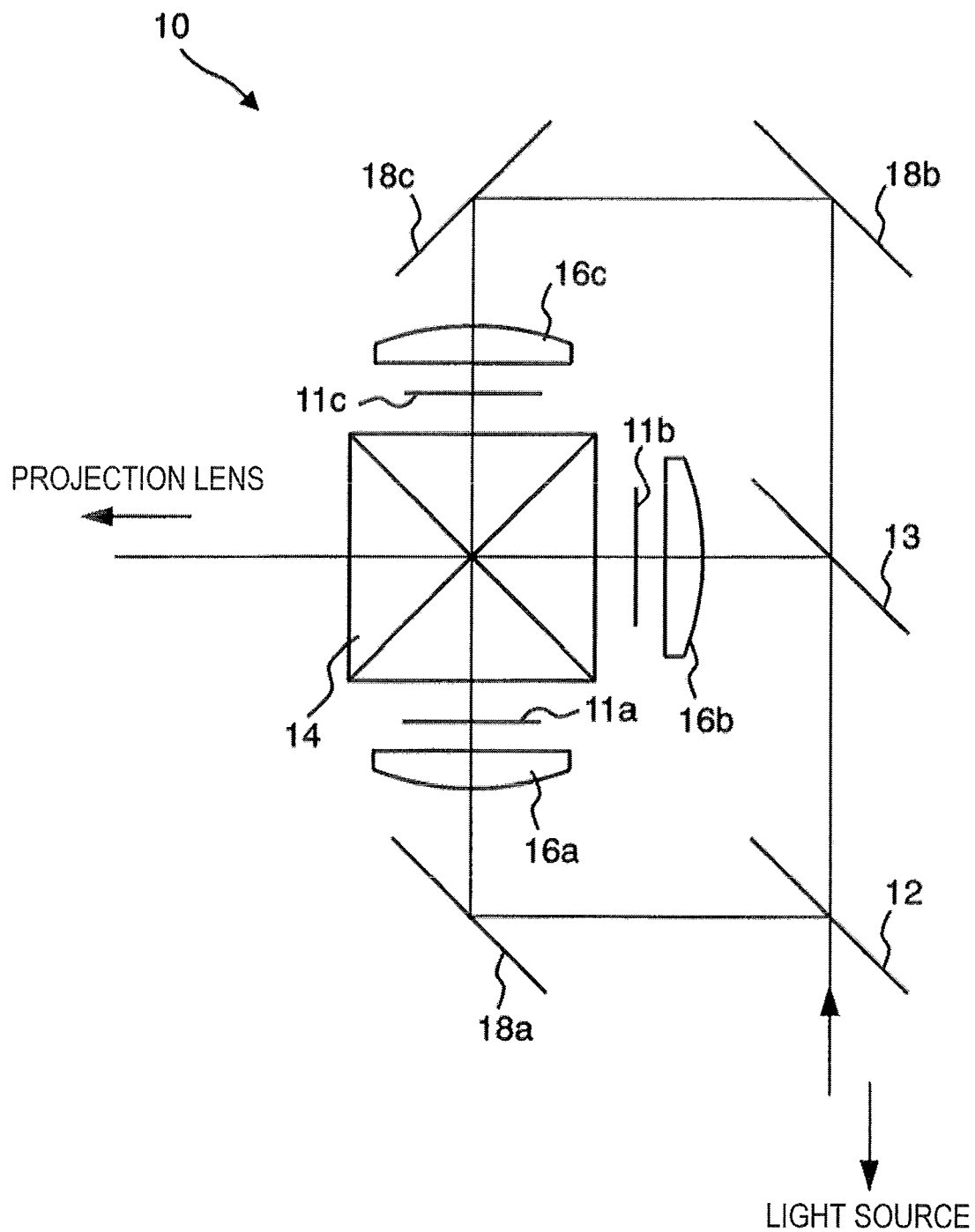
FIG. 13 is a diagram schematically illustrating the structure of a projection display device according to an embodiment of the invention.

An example of a projection display device provided with the above-mentioned projection variable focusing lens will be described with reference to FIG. 13. The projection display device shown in FIG. 13 includes transmissive liquid crystal panels 11a to 11c as light valves and uses the projection variable focusing lens according to the above-described embodiment as a projection variable focusing lens 10. An integrator (not shown), such as a fly-eye lens, is provided between a light source (not shown) and a dichroic mirror 12. White light emitted from the light source is incident on the liquid crystal panels 11a to 11c corresponding to three color beams (G light, B light, and R light) through an illumination optical unit and then modulated. The modulated light components are composed by a cross dichroic prism 14, and the composed light is projected onto a screen (not shown) by the projection variable focusing lens 10. This device includes the dichroic mirrors 12 and 13 for color separation, the cross dichroic prism 14 for color composition, condenser lenses 16a to 16c, and total reflecting mirrors 18a to 18c. In this embodiment, the projection display device uses the projection variable focusing lens according to this embodiment. Therefore, the projection display device can have a small size, a high magnifying power, a light weight, and a low manufacturing cost. In addition, the projection display device can maintain a high optical performance.

The use of the projection variable focusing lens according to this embodiment of the invention is not limited to the projection display device using a transmissive liquid crystal display panel, but the projection variable focusing lens according to this embodiment can be used for a display device using a reflective liquid crystal display panel or another light modulating unit, such as a DMD.

EXAMPLES

Next, the projection variable focusing lens according to the invention will be described with reference to detailed examples.

Example 1

As described above, a projection variable focusing lens according to Example 1 has the structure shown in FIG. 1. That is, in the projection variable focusing lens, a first lens group $G_1$ includes a first lens $L_1$, which is a biconcave lens having aspheric surfaces at both sides (on the axis), and a second lens $L_2$, which is a biconcave lens having a concave surface that has a curvature stronger than that on the magnification side and faces the reduction side, arranged in this order from the magnification side. In addition, a second lens group $G_2$ includes a third lens $L_3$, which is a biconvex lens, a mask 3, and a fourth lens $L_4$, which is a biconvex lens. A third lens group $G_3$ includes a fifth lens $L_5$, which is a biconcave lens, a sixth lens $L_6$, which is a positive meniscus lens having a convex surface facing the reduction side, a seventh lens $L_7$, which is a biconvex lens, and an eighth lens $L_8$, which is a positive meniscus lens having a convex surface facing the magnification side.

When power varies from the wide angle end to the telephoto end, only the second lens group $G_2$ is moved to the magnification side along the optical axis X.

Focusing is performed by moving the first lens group $G_1$ in the X direction, which is the optical axis.

In Table 1, an upper part shows the curvature radius R of each lens surface according to Example 1 (the focal length of the entire lens system is normalized to 1.0, which is similarly applied to the following tables), the thickness of the center of each lens and an air space D between the lenses (which are normalized, similar to the curvature radius R, which are similarly applied to the following tables), and the refractive index Nd and the Abbe number vd of each lens with respect to the d-line. In Table 1 and Tables 2 to 4, which will be described below, numbers corresponding to R, D, Nd, and vd are sequentially increased from the magnification side.

In Table 1, a middle part shows the values of constants K and $A_3$ to $A_{12}$ corresponding to the aspheric surfaces. In Table 1, a lower part shows a variable spacing 1 (the gap between the first lens group $G_1$ and the second lens group $G_2$) and a variable spacing 2 (the gap between the second lens group $G_2$ and the third lens group $G_3$) at the wide angle end (wide) and the telephoto end (tele) when a projection distance is 109.85 and 470.85.

TABLE 1

| Surface Number | R | D | Nd | vd |
|---|---|---|---|---|
| 1* | −4.709 | 0.127 | 1.4910 | 57.6 |
| 2* | 5.884 | 0.283 | | |
| 3 | −163.042 | 0.061 | 1.5163 | 64.1 |
| 4 | 1.070 | Variable spacing 1 | | |
| 5 | 2.203 | 0.182 | 1.8061 | 40.9 |
| 6 | −6.179 | 0.494 | | |
| 7 (mask) | ∞ | 1.000 | | |
| 8 | 5.460 | 0.131 | 1.7130 | 53.9 |
| 9 | −1.755 | Variable spacing 2 | | |
| 10 | −1.156 | 0.047 | 1.8052 | 25.4 |
| 11 | 2.214 | 0.103 | | |
| 12 | −1.469 | 0.257 | 1.6230 | 58.2 |
| 13 | −1.254 | 0.056 | | |
| 14 | 3.832 | 0.286 | 1.6230 | 58.2 |
| 15 | −1.502 | 0.111 | | |
| 16 | 1.723 | 0.211 | 1.6230 | 58.2 |
| 17 | 5.680 | 0.731 | | |
| 18 | ∞ | 1.116 | 1.5163 | 64.1 |
| 19 | ∞ | | | |

| | K | $A_3$ | $A_4$ | $A_5$ | $A_6$ |
|---|---|---|---|---|---|
| 1 | 1.0000 | 1.6904E−02 | 1.1528E+00 | 9.3333E−01 | −8.3828E+00 |
| 2 | 1.0000 | 5.7040E−03 | 1.6987E+00 | −2.5955E+00 | 4.4328E+00 |

| | $A_7$ | $A_8$ | $A_9$ | $A_{10}$ | $A_{11}$ | $A_{12}$ |
|---|---|---|---|---|---|---|
| 1 | 1.6546E+01 | −1.7465E+01 | 1.0207E+01 | −2.5691E+00 | 0.0000E+00 | 0.0000E+00 |
| 2 | −7.6542E+00 | 6.7226E+00 | −1.4115E+00 | −6.4643E−01 | 0.0000E+00 | 0.0000E+00 |

| | Projection distance | | | |
|---|---|---|---|---|
| | 109.85 | | 470.85 | |
| | Wide | Tele | Wide | Tele |
| Variable spacing 1 | 0.761 | 0.492 | 0.747 | 0.479 |
| Variable spacing 2 | 0.093 | 0.296 | 0.093 | 0.296 |

*aspheric surface

In addition, Table 5 shows numerical values corresponding to Conditional expressions 1 to 3, Conditional expressions 1' to 3', and Conditional expressions 1" and 2" according to Example 1.

Figure 5:
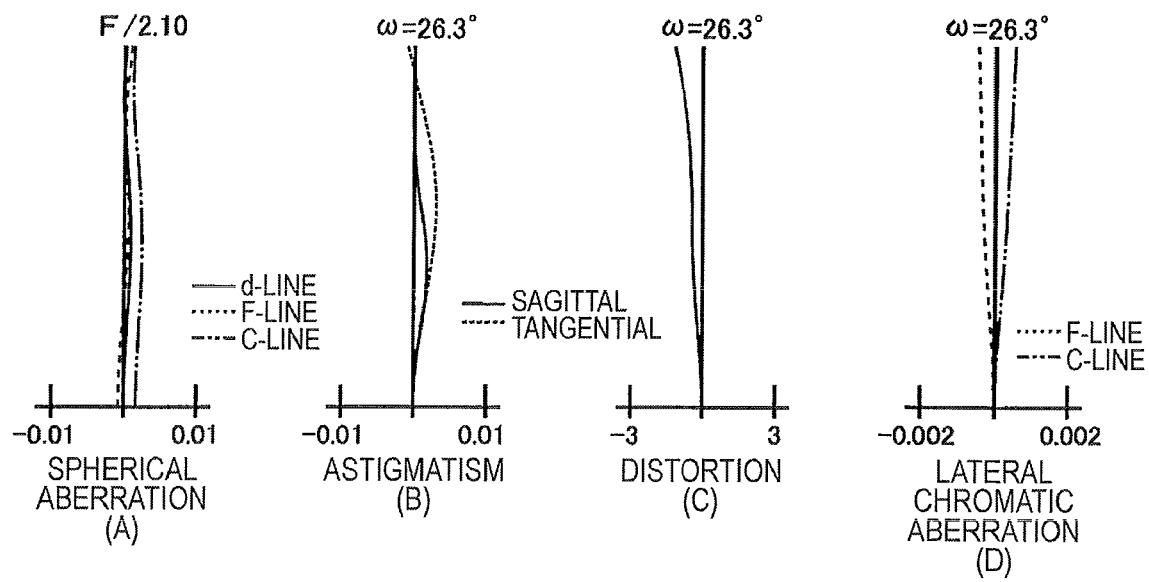
FIG. 5 is a diagram illustrating the aberrations of the projection variable focusing lens according to Example 1 at a wide angle end, in which (A) shows spherical aberration, (B) shows astigmatism, (C) shows distortion, and (D) shows lateral chromatic aberration.
Figure 6:
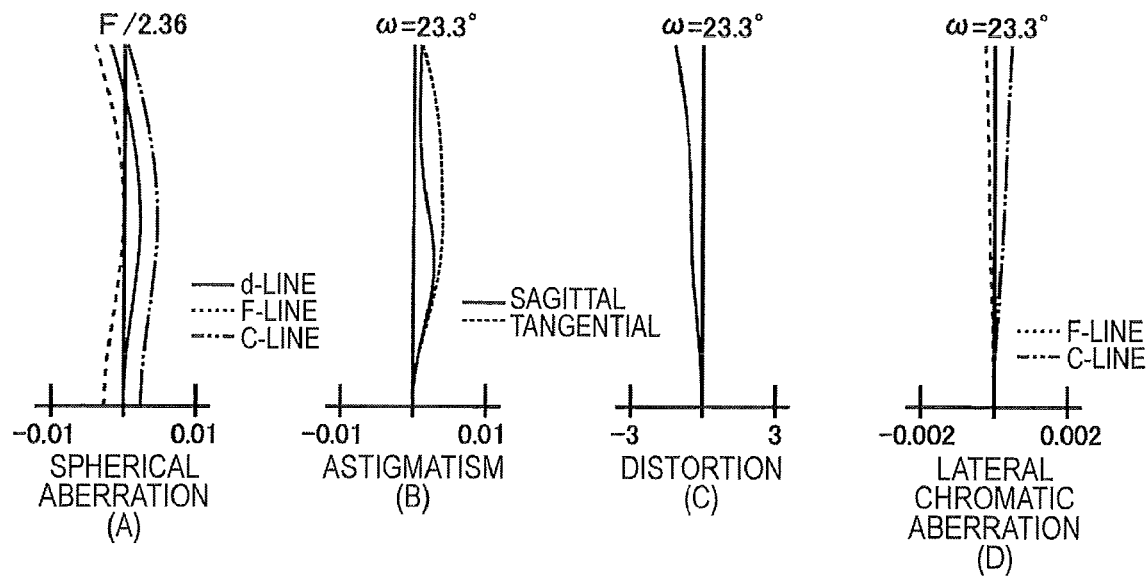
FIG. 6 is a diagram illustrating the aberrations of the projection variable focusing lens according to Example 1 at a telephoto end, in which (A) shows spherical aberration, (B) shows astigmatism, (C) shows distortion, and (D) shows lateral chromatic aberration.

FIGS. 5 and 6 are diagrams illustrating all aberrations (spherical aberration, astigmatism, distortion, and lateral chromatic aberration) of the projection variable focusing lens according to Example 1 at the wide angle end (wide: a projection distance of 109.85) and the telephoto end (tele: a projection distance of 109.85). FIGS. 5 to 12 show the spherical aberration of light with respect to the d-line, the F-line, and C-line, the astigmatism of a sagittal image surface and a tangential image surface, and the lateral chromatic aberration of light with respect to the d-line, the F-line, and the C-line.

As can be seen from FIGS. 5 and 6, the projection variable focusing lens according to Example 1 has an angle of view $2\omega$ of 52.6 degrees, which is a wide angle, and an F number of 2.10, which is a large value, at the wide angle end. Therefore, all aberrations are effectively corrected.

In addition, as shown in Table 5, the projection variable focusing lens according to Example 1 satisfies all of Conditional expressions 1 to 3, Conditional expressions 1' to 3'; and Conditional expressions 1" and 2".

Example 2

Figure 2B:
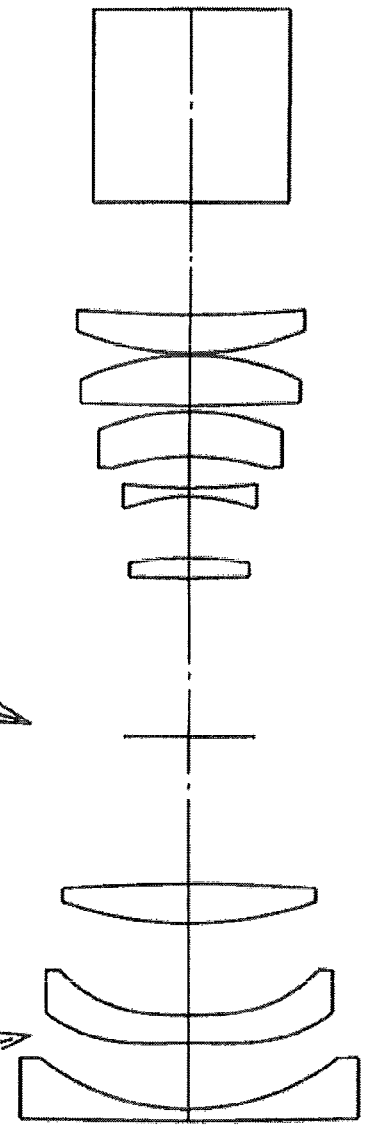

FIG. 2 is a diagram schematically illustrating the structure of a projection variable focusing lens according to Example 2. The projection variable focusing lens according to Example 2 has substantially the same structure as that according to Example 1 except that a first lens group $G_1$ includes a first lens $L_1$, which is a negative meniscus lens having a concave surface facing the reduction side, and a second lens $L_2$, which is a meniscus lens having aspheric surfaces at both sides, one of which is a concave surface facing the reduction side.

In Table 2, an upper part shows the curvature radius R of each lens surface according to Example 2, the thickness of the center of each lens and an air space D between the lenses, and the refractive index Nd and the Abbe number vd of each lens with respect to the d-line.

In Table 2, a middle part shows the values of constants K and $A_3$ to $A_{12}$ corresponding to the aspheric surfaces. In Table 2, a lower part shows a variable spacing 1 (the gap between the first lens group $G_1$ and the second lens group $G_2$) and a variable spacing 2 (the gap between the second lens group $G_2$ and the third lens group $G_3$) at the wide angle end (wide) and the telephoto end (tele) when a projection distance is 125.40 and 542.84.

TABLE 2

| Surface Number | R | D | Nd | vd |
|---|---|---|---|---|
| 1 | 38.438 | 0.071 | 1.4970 | 81.5 |
| 2 | 1.471 | 0.415 | | |
| 3* | −7.008 | 0.174 | 1.5101 | 56.2 |
| 4* | 3.727 | Variable spacing 1 | | |
| 5 | 2.332 | 0.247 | 1.8040 | 46.6 |
| 6 | −11.187 | 0.923 | | |
| 7 (mask) | ∞ | 0.989 | | |
| 8 | 7.120 | 0.132 | 1.7550 | 52.3 |
| 9 | −2.049 | Variable spacing 2 | | |
| 10 | −1.089 | 0.054 | 1.8467 | 23.8 |
| 11 | 3.708 | 0.195 | | |
| 12 | −1.616 | 0.283 | 1.7292 | 54.7 |
| 13 | −1.425 | 0.037 | | |
| 14 | 11.526 | 0.317 | 1.6968 | 55.5 |
| 15 | −1.569 | 0.011 | | |
| 16 | 1.787 | 0.242 | 1.6204 | 60.3 |
| 17 | 8.229 | 0.701 | | |
| 18 | ∞ | 1.205 | 1.5163 | 64.1 |
| 19 | ∞ | | | |

| | K | $A_3$ | $A_4$ | $A_5$ | $A_6$ |
|---|---|---|---|---|---|
| 3 | 1.0000 | −3.7887E−02 | 9.6035E−01 | −3.4034E−01 | −8.5506E+00 |
| 4 | 1.0000 | −7.1676E−03 | 8.1755E−01 | −1.1347E−01 | −4.3721E−01 |

| | $A_7$ | $A_8$ | $A_9$ | $A_{10}$ | $A_{11}$ | $A_{12}$ |
|---|---|---|---|---|---|---|
| 3 | 4.0211E−01 | 7.9494E−01 | −6.1422E−01 | 6.5620E−02 | 0.0000E+00 | 0.0000E+00 |
| 4 | −5.7201E−01 | 5.1001E−01 | 1.2359E+00 | −1.0301E+00 | 0.0000E+00 | 0.0000E+00 |

| | Projection distance | | | |
|---|---|---|---|---|
| | 125.40 | | 542.84 | |
| | Wide | Tele | Wide | Tele |
| Variable spacing 1 | 1.096 | 0.574 | 1.078 | 0.555 |
| Variable spacing 2 | 0.109 | 0.386 | 0.109 | 0.386 |

*aspheric surface

In addition, Table 5 shows numerical values corresponding to the conditional expressions according to Example 2.

Figure 7:
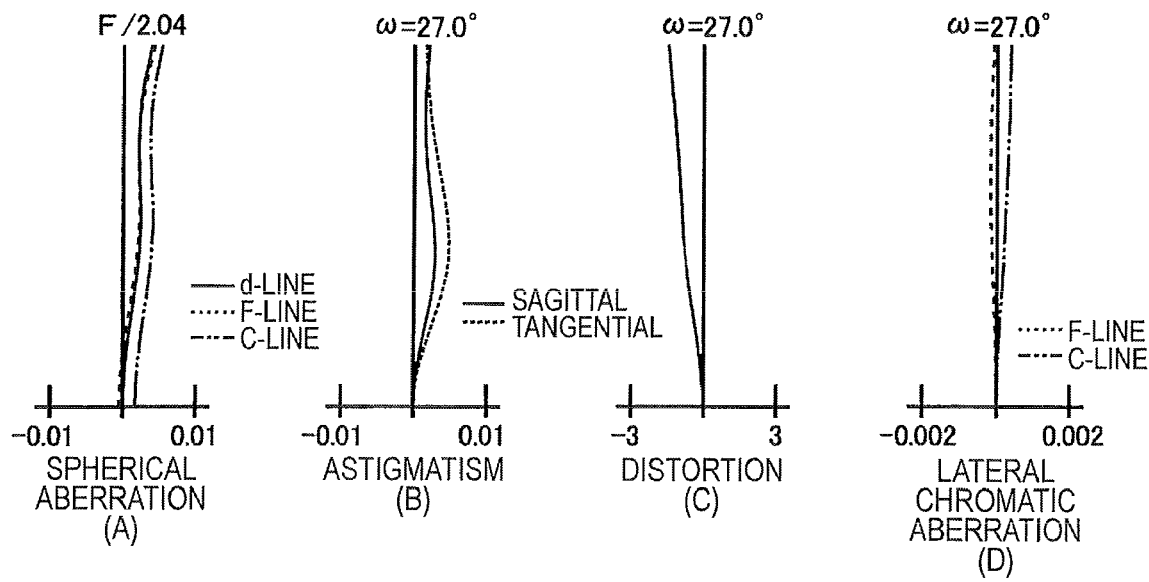
FIG. 7 is a diagram illustrating the aberrations of the projection variable focusing lens according to Example 2 at the wide angle end, in which (A) shows spherical aberration, (B) shows astigmatism, (C) shows distortion, and (D) shows lateral chromatic aberration.
Figure 8:
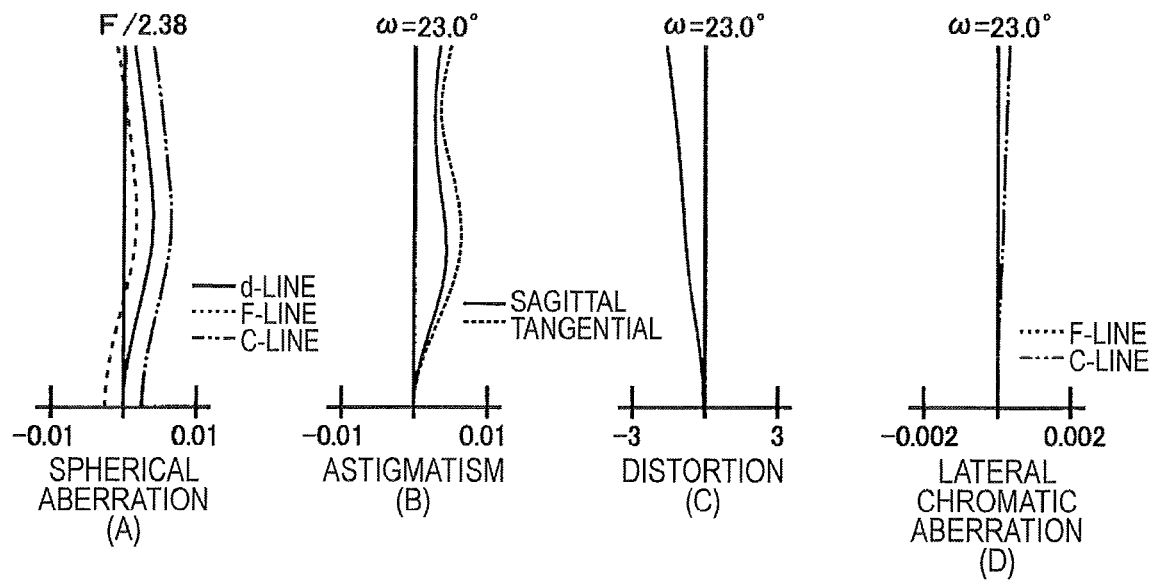
FIG. 8 is a diagram illustrating the aberrations of the projection variable focusing lens according to Example 2 at the telephoto end, in which (A) shows spherical aberration, (B) shows astigmatism, (C) shows distortion, and (D) shows lateral chromatic aberration.

FIGS. 7 and 8 are diagrams illustrating all aberrations (spherical aberration, astigmatism, distortion, and lateral chromatic aberration) of the projection variable focusing lens according to Example 2 at the wide angle end (wide: a projection distance of 125.40) and the telephoto end (tele: a projection distance of 125.40).

As can be seen from FIGS. 7 and 8, the projection variable focusing lens according to Example 2 has an angle of view 2ω of 54.0 degrees, which is a wide angle, and an F number of 2.04, which is a large value, at the wide angle end. Therefore, all aberrations are effectively corrected.

In addition, as shown in Table 5, the projection variable focusing lens according to Example 2 satisfies all of Conditional expressions 1 to 3, Conditional expressions 1' to 3', and Conditional expressions 1" and 2".

Example 3

FIG. 3 is a diagram schematically illustrating the structure of a projection variable focusing lens according to Example 3.

The projection variable focusing lens according to Example 3 has substantially the same structure as that according to Example 1 except that a first lens group $G_1$ includes only a first lens $L_1$, which is a biconcave lens having aspheric surfaces at both sides. Since the first lens group $G_1$ includes one lens, the lens numbers of the other lenses are decreased by one, as compared to the corresponding lenses according to Example 1.

In Table 3, an upper part shows the curvature radius R of each lens surface according to Example 3, the thickness of the center of each lens and an air space D between the lenses, and the refractive index Nd and the Abbe number vd of each lens with respect to the d-line.

In Table 3, a middle part shows the values of constants K and $A_3$ to $A_{12}$ corresponding to the aspheric surfaces. In Table 3, a lower part shows a variable spacing 1 (the gap between the first lens group $G_1$ and the second lens group $G_2$) and a variable spacing 2 (the gap between the second lens group $G_2$ and the third lens group $G_3$) at the wide angle end (wide) and the telephoto end (tele) when a projection distance is 125.50 and 543.28.

Figure 9:
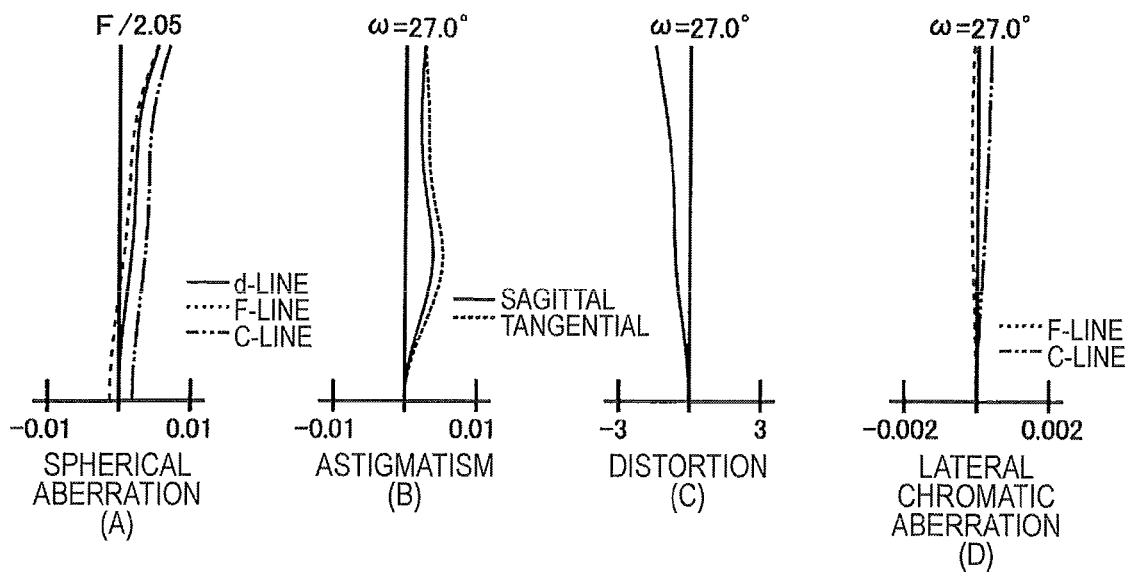
FIG. 9 is a diagram illustrating the aberrations of the projection variable focusing lens according to Example 3 at the wide angle end, in which (A) shows spherical aberration, (B) shows astigmatism, (C) shows distortion, and (D) shows lateral chromatic aberration.
Figure 10:
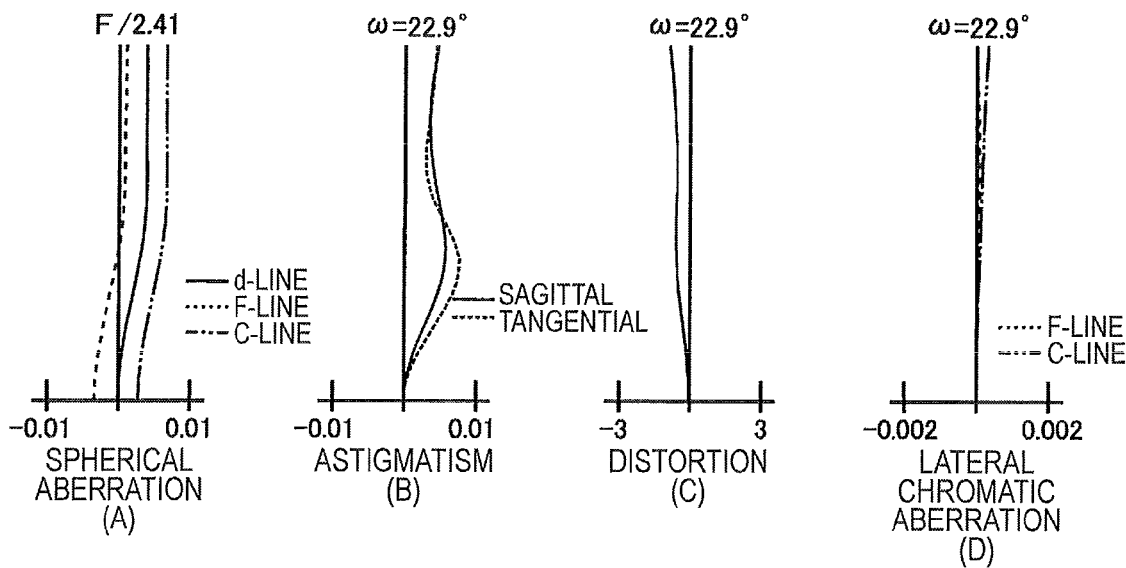
FIG. 10 is a diagram illustrating the aberrations of the projection variable focusing lens according to Example 3 at the telephoto end, in which (A) shows spherical aberration, (B) shows astigmatism, (C) shows distortion, and (D) shows lateral chromatic aberration.

As can be seen from FIGS. 9 and 10, the projection variable focusing lens according to Example 3 has an angle of view $2\omega$ of 54.0 degrees, which is a wide angle, and an F number of 2.05, which is a large value, at the wide angle end. Therefore, all aberrations are effectively corrected.

In addition, as shown in Table 5, the projection variable focusing lens according to Example 3 satisfies all of Conditional expressions 1 to 3, Conditional expressions 1' to 3', and Conditional expressions 1" and 2'.

Example 4

Figure 4A:
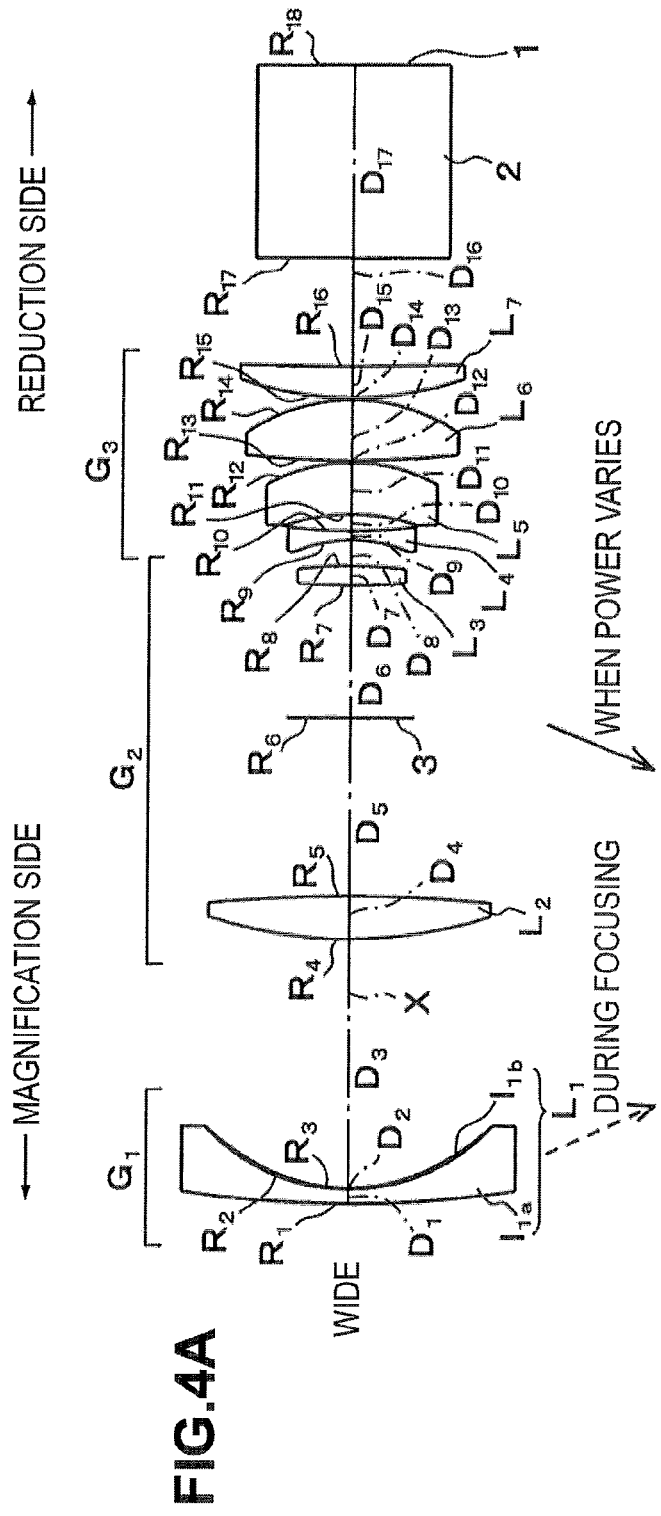
FIGS. 4A and 4B are diagrams schematically illustrating the structure of a projection variable focusing lens according to Example 4 of the invention at a wide angle end (wide) and a telephoto end (tele)
Figure 4B:
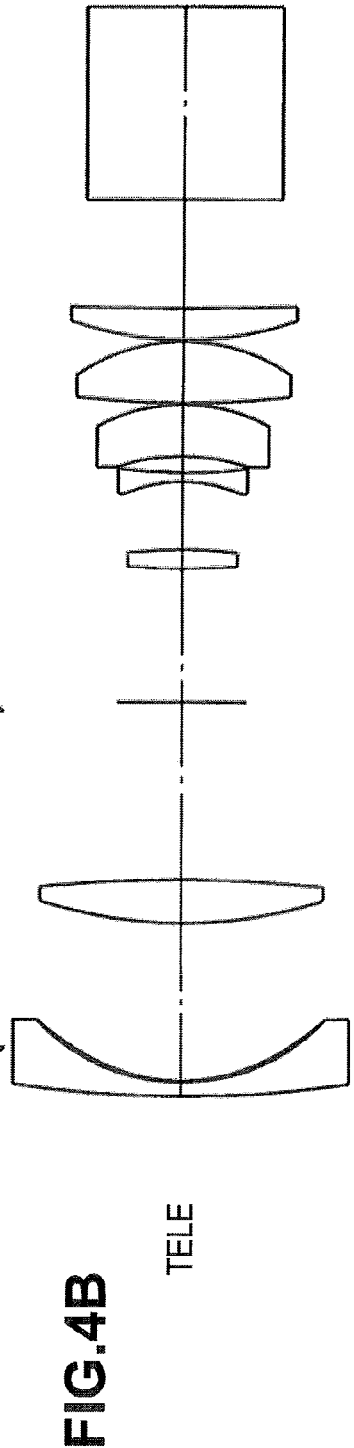

FIG. 4 is a diagram schematically illustrating the structure of a projection variable focusing lens according to Example 4. The projection variable focusing lens according to Example 4 has substantially the same structure as that according to Example 1 except that a first lens group $G_1$ includes only a composite aspheric lens $L_1$. The composite aspheric lens $L_1$ is formed by adding a resin $l_{1b}$ to a reduction-side surface of a negative meniscus-shaped spherical glass lens $l_{1a}$ having a concave surface facing the reduction side. A reduction-side

TABLE 3

| Surface Number | R | D | Nd | vd |
|---|---|---|---|---|
| 1* | −6.981 | 0.087 | 1.4970 | 81.5 |
| 2* | 1.018 | Variable spacing 1 | | |
| 3 | 2.452 | 0.294 | 1.8040 | 46.6 |
| 4 | −7.695 | 1.168 | | |
| 5 (mask) | ∞ | 0.693 | | |
| 6 | 4.591 | 0.126 | 1.7292 | 54.7 |
| 7 | −2.206 | Variable spacing 2 | | |
| 8 | −1.011 | 0.054 | 1.8467 | 23.8 |
| 9 | 3.836 | 0.107 | | |
| 10 | −1.445 | 0.307 | 1.7292 | 54.7 |
| 11 | −1.226 | 0.197 | | |
| 12 | 28.093 | 0.310 | 1.7550 | 52.3 |
| 13 | −1.575 | 0.011 | | |
| 14 | 2.076 | 0.247 | 1.6030 | 65.4 |
| 15 | 94.059 | 0.680 | | |
| 16 | ∞ | 1.206 | 1.5163 | 64.1 |
| 17 | ∞ | | | |

| | K | $A_3$ | $A_4$ | $A_5$ | $A_6$ |
|---|---|---|---|---|---|
| 1 | 1.0000 | 2.8006E−01 | −5.0833E−01 | 6.2232E−01 | −5.4927E−01 |
| 2 | 1.0000 | 3.0086E−01 | −5.6231E−01 | 4.1603E−01 | −2.2972E−01 |

| | $A_7$ | $A_8$ | $A_9$ | $A_{10}$ | $A_{11}$ | $A_{12}$ |
|---|---|---|---|---|---|---|
| 1 | −1.9961E−01 | 1.1910E+00 | −1.1188E+00 | 3.4251E−01 | 0.0000E+00 | 0.0000E+00 |
| 2 | −3.3204E−01 | 2.8901E−01 | 4.8068E−01 | −5.5007E−01 | 0.0000E+00 | 0.0000E+00 |

| | Projection distance | | | |
|---|---|---|---|---|
| | 125.50 | | 543.28 | |
| | Wide | Tele | Wide | Tele |
| Variable spacing 1 | 1.089 | 0.612 | 1.070 | 0.593 |
| Variable spacing 2 | 0.107 | 0.395 | 0.107 | 0.395 |

*aspheric surface

In addition, Table 5 shows numerical values corresponding to the conditional expressions according to Example 3.

FIGS. 9 and 10 are diagrams illustrating all aberrations (spherical aberration, astigmatism, distortion, and lateral chromatic aberration) of the projection variable focusing lens according to Example 3 at the wide angle end (wide: a projection distance of 125.50) and the telephoto end (tele: a projection distance of 125.50).

surface of the resin film $l_{1b}$ is an aspheric surface. Since the first lens group $G_1$ includes one lens, the lens numbers of the other lenses are decreased by one, as compared to the corresponding lenses according to Example 1.

In Table 4, an upper part shows the curvature radius R of each lens surface according to Example 4, the thickness of the center of each lens and an air space D between the lenses, and the refractive index Nd and the Abbe number νd of each lens with respect to the d-line.

In Table 4, a middle part shows the values of constants K and $A_3$ to $A_{12}$ corresponding to the aspheric surfaces. In Table 4, a lower part shows a variable spacing 1 (the gap between the first lens group $G_1$ and the second lens group $G_2$) and a variable spacing 2 (the gap between the second lens group $G_2$ and the third lens group $G_3$) at the wide angle end (wide) and the telephoto end (tele) when a projection distance is 125.35 and 542.66.

TABLE 4

| Surface Number | R | D | Nd | νd |
|---|---|---|---|---|
| 1 | 6.945 | 0.087 | 1.6667 | 48.3 |
| 2 | 1.205 | 0.008 | 1.5277 | 41.8 |
| 3* | 1.089 | Variable spacing 1 | | |
| 4 | 2.754 | 0.274 | 1.8348 | 42.7 |
| 5 | −8.880 | 1.112 | | |
| 6 (mask) | ∞ | 0.837 | | |
| 7 | 4.477 | 0.122 | 1.7550 | 52.3 |
| 8 | −2.657 | Variable spacing 2 | | |
| 9 | −0.895 | 0.054 | 1.8052 | 25.4 |
| 10 | 2.977 | 0.106 | | |
| 11 | −1.245 | 0.323 | 1.7550 | 52.3 |
| 12 | −1.101 | 0.011 | | |
| 13 | 5.764 | 0.386 | 1.4970 | 81.5 |
| 14 | −1.151 | 0.011 | | |
| 15 | 2.076 | 0.198 | 1.7292 | 54.7 |
| 16 | 21.412 | 0.678 | | |
| 17 | ∞ | 1.205 | 1.5163 | 64.1 |
| 18 | ∞ | | | |

| | K | $A_3$ | $A_4$ | $A_5$ | $A_6$ |
|---|---|---|---|---|---|
| 3 | 1.0000 | 6.9545E−03 | 5.9511E−02 | −7.2774E−01 | 1.5035E+00 |

| | $A_7$ | $A_8$ | $A_9$ | $A_{10}$ | $A_{11}$ | $A_{12}$ |
|---|---|---|---|---|---|---|
| 3 | −1.0715E+00 | −9.8021E−01 | 1.9309E+00 | −8.8208E−01 | 0.0000E+00 | 0.0000E+00 |

| | Projection distance | | | |
|---|---|---|---|---|
| | 125.35 | | 542.66 | |
| | Wide | Tele | Wide | Tele |
| Variable spacing 1 | 1.558 | 0.987 | 1.534 | 0.963 |
| Variable spacing 2 | 0.162 | 0.424 | 0.162 | 0.424 |

*aspheric surface

TABLE 5

| | Conditional expression | | |
|---|---|---|---|
| | (1), (1'), (1") | (2), (2'), (2") | (3), (3') |
| Example 1 | 1.67 | 0.36 | 1.47 |
| Example 2 | 2.09 | 0.36 | 1.50 |
| Example 3 | 2.04 | 0.39 | 1.48 |
| Example 4 | 2.13 | 0.37 | 1.47 |

In addition, Table 5 shows numerical values corresponding to the conditional expressions according to Example 4.

Figure 11:
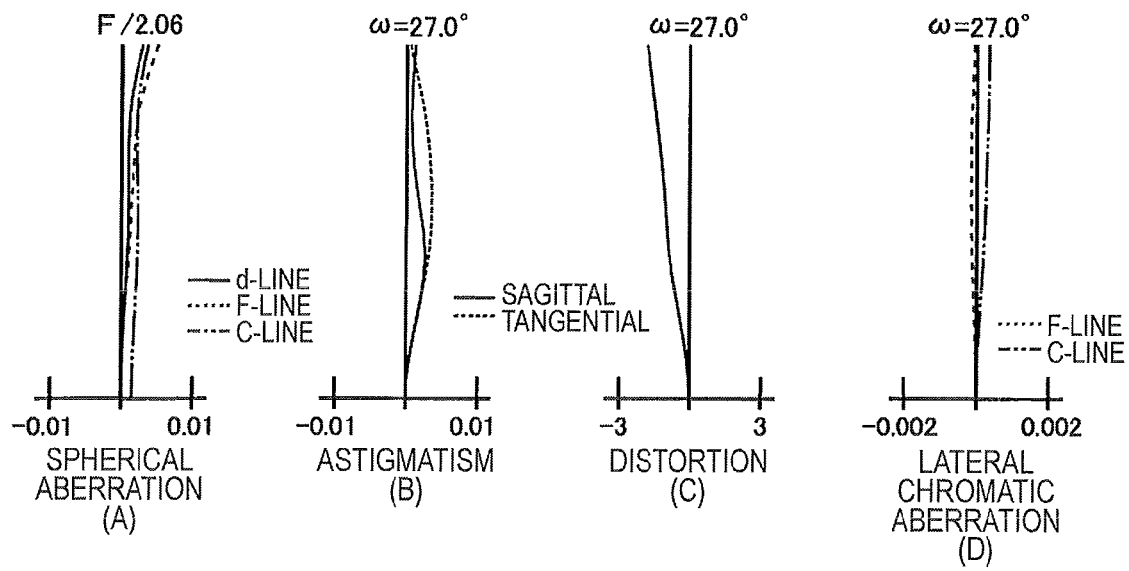
FIG. 11 is a diagram illustrating the aberrations of the projection variable focusing lens according to Example 4 at the wide angle end, in which (A) shows spherical aberration, (B) shows astigmatism, (C) shows distortion, and (D) shows lateral chromatic aberration.
Figure 12:
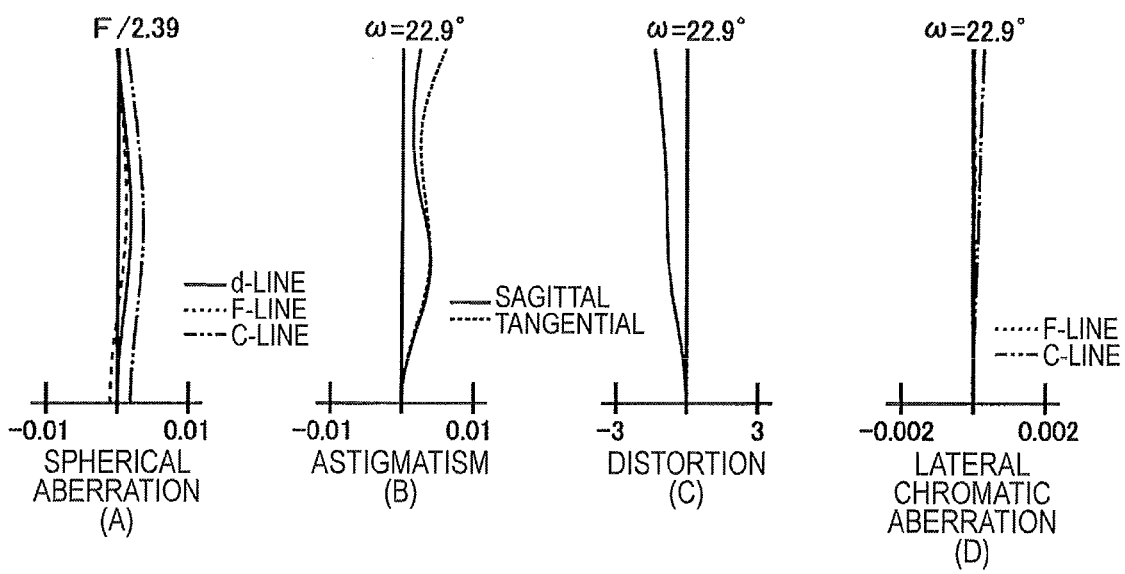
FIG. 12 is a diagram illustrating the aberrations of the projection variable focusing lens according to Example 4 at the telephoto end, in which (A) shows spherical aberration, (B) shows astigmatism, (C) shows distortion, and (D) shows lateral chromatic aberration.

FIGS. 11 and 12 are diagrams illustrating all aberrations (spherical aberration, astigmatism, distortion, and lateral chromatic aberration) of the projection variable focusing lens according to Example 4 at the wide angle end (wide: a projection distance of 125.35) and the telephoto end (tele: a projection distance of 125.35).

As can be seen from FIGS. 11 and 12, the projection variable focusing lens according to Example 4 has an angle of view 2ω of 54.0 degrees, which is a wide angle, and an F number of 2.06, which is a large value, at the wide angle end. Therefore, all aberrations are effectively corrected.

As shown in Table 5, the projection variable focusing lens according to Example 4 satisfies all of Conditional expressions 1 to 3, Conditional expressions 1' to 3', and Conditional expressions 1" and 2".

What is claimed is:

1. A projection variable focusing lens comprising:
 a first lens group having a negative refractive power;
 a second lens group having a positive refractive power; and
 a third lens group having a positive refractive power,
 wherein the first to third lens groups are arranged in this order from a magnification side,
 when a focal length varies, only the second lens group is moved in an optical axis direction,
 during focusing, the first lens group is moved in the optical axis direction, and
 a reduction side is substantially telecentric,
 wherein the second lens group satisfies the following conditional expression:

$0.15 < D_2/L < 0.55$ where $D_2$ indicates the largest surface spacing between lenses in the second lens group and L indicates the total length of the lenses.

2. The projection variable focusing lens according to claim 1,
wherein the third lens group includes two or more lenses.

3. The projection variable focusing lens according to claim 1,
wherein the second lens group satisfies the following conditional expression:

$$1.0 < f_2/f_w < 4.0$$

where $f_W$ indicates the focal length of the entire system at a wide angle end, and $f_2$ indicates the focal length of the second lens group.

4. The projection variable focusing lens according to claim 1,
wherein the second lens group includes two positive lenses.

5. The projection variable focusing lens according to claim 1,
wherein the third lens group includes a first negative lens, a second positive lens having a convex surface facing the reduction side, a third positive lens having a convex surface facing the reduction side, and a fourth positive lens having a convex surface facing the magnification side arranged in this order from the magnification side.

6. The projection variable focusing lens according to claim 1,
wherein the first lens group includes one negative lens having a concave surface facing the reduction side.

7. The projection variable focusing lens according to claim 1,
wherein the first lens group includes one negative lens having a concave surface facing the reduction side,
the second lens group includes two positive lenses,
the third lens group includes a first negative lens, a second positive lens having a convex surface facing the reduction side, a third positive lens having a convex surface facing the reduction side, and a fourth positive lens having a convex surface facing the magnification side arranged in this order from the magnification side, and
the entire system includes seven lenses.

8. A projection display device comprising:
at least one light source;
at least one light valve;
at least one illumination optical unit that guides light emitted from the light source to the light valve; and
the projection variable focusing lens according to claim 1,
wherein the light valve modulates the light emitted from the light source, and
the modulated light is projected onto a screen by the projection variable focusing lens.

9. The projection variable focusing lens according to claim 1,
wherein the first lens group has two lenses including a negative lens that has a concave surface facing the reduction side.

10. The projection variable focusing lens according to claim 9,
wherein the first lens group includes at least one aspheric surface.

11. The projection variable focusing lens according to claim 1,
wherein the first lens group has two lenses including a negative lens that has a concave surface facing the reduction side,
the second lens group includes two positive lenses,
the third lens group includes a first negative lens, a second positive lens having a convex surface facing the reduction side, a third positive lens having a convex surface facing the reduction side, and a fourth positive lens having a convex surface facing the magnification side arranged in this order from the magnification side, and
the entire system includes eight lenses.

12. The projection variable focusing lens according to claim 11,
wherein the first lens group includes at least one aspheric surface.

13. The projection variable focusing lens according to claim 7,
wherein the first lens group includes at least one aspheric surface.

* * * * *